United States Patent
Yamada et al.

(10) Patent No.: US 6,490,915 B2
(45) Date of Patent: Dec. 10, 2002

(54) THERMAL TYPE AIR FLOW SENSOR AND CONTROL DEVICE FOR A VEHICLE

(75) Inventors: Masamichi Yamada, Hitachinaka (JP); Izumi Watanabe, Hitachinaka (JP); Keiichi Nakada, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 09/759,224

(22) Filed: Jan. 16, 2001

(65) Prior Publication Data

US 2001/0015199 A1 Aug. 23, 2001

(30) Foreign Application Priority Data

Jan. 14, 2000 (JP) ........................................ 2000-010103

(51) Int. Cl.[7] ................................................ G01N 19/00
(52) U.S. Cl. ...................................... 73/118.2; 123/494
(58) Field of Search ............................ 73/118.2, 117.3; 257/769; 123/494

(56) References Cited

U.S. PATENT DOCUMENTS

| | | | | |
|---|---|---|---|---|
| 4,304,130 A | * | 12/1981 | Peter et al. ................ 73/116 |
| 4,571,996 A | * | 2/1986 | Wakeman et al. .......... 73/118.2 |
| 5,086,745 A | * | 2/1992 | Nishimura et al. .......... 123/494 |
| 5,237,867 A | * | 8/1993 | Cook, Jr. ................. 73/204.15 |
| 5,693,879 A | * | 12/1997 | Rilling et al. ............... 73/118.2 |
| 5,780,173 A | * | 7/1998 | Harrington et al. ......... 428/661 |
| 5,940,784 A | * | 8/1999 | El-Husayni ............... 73/204.19 |
| 5,965,811 A | * | 10/1999 | Kawai et al. ............... 73/118.2 |

FOREIGN PATENT DOCUMENTS

| JP | 2880651 | 1/1999 |
|---|---|---|
| JP | 11-83580 | 3/1999 |

* cited by examiner

*Primary Examiner*—Erick Solis
(74) *Attorney, Agent, or Firm*—Crowell & Moring LLP

(57) ABSTRACT

A thermal type air flow rate sensor is formed with at least a heating resistor and a temperature measuring resistor on a semiconductor substrate via an electric insulation film, by forming the heating resistor and the temperature measuring resistor with an impurity doped silicon (Si) semiconductor thin film, and by performing high concentration doping process so that an electric resistivity ($\rho$) of the silicon (Si) semiconductor thin film is less than or equal to $8\times10^{-4}$ $\Omega$ cm, with simplified fabrication process for formation of the silicon (Si) semiconductor thin film at the same impurity concentration simultaneously in a lump at low cost.

13 Claims, 6 Drawing Sheets

THERMAL TYPE AIR FLOW SENSOR AND CONTROL DEVICE FOR A VEHICLE

BACKGROUND OF THE INVENTION

The present invention relates to a thermal type air flow rate sensor and a detection element, and more particularly, to a thermal type air flow rate sensor suitable for measuring an intake air flow rate of an internal combustion engine.

Conventionally, as an air flow rate sensor for measuring an intake air flow rate is provided in an electronically controlled fuel injection system for an internal combustion engine of an automotive vehicle, a thermal type sensor is a mainstream for capability of direct detection of mass air flow rate. Amongst, an air flow rate sensor fabricated by a semiconductor micro-machining technology is attracting attention for capability of lowering of cost and driving at low power.

The thermal type air flow rate sensors employing the conventional semiconductor substrate have been disclosed in Japanese Patent No. 2880651 and Japanese Patent Application Laid-open No. 11-83850 (1999).

In the technology disclosed in Japanese Patent No. 2880651, polycrystalline silicon (poly-silicon) has been used as a heating resistor for advantage in heat-electric resistivity and material cost. However, consideration has not be given for temperature dependency of air temperature upon measuring an intake air flow rate, and thus, accuracy of flow rate measurement cannot be sufficient. Also, a problem is encountered in mechanical strength or the like of an electric insulation film supporting the heating resistor.

On the other hand, in the technology disclosed in Japanese Patent Application Laid-Open No. Heisei 11-83580, in addition to a heating resistor, an air temperature measuring resistor is formed with polycrystalline silicon (poly-silicon) to consider temperature dependency of the air temperature. However, since the heating resistor and the temperature measuring resistor are formed with polycrystalline silicon (poly-silicon) respectively having different impurity concentration, fabrication process becomes complicate and cost is high.

The prior arts encounter the following problems. In Japanese Patent No. 2880651, the polycrystalline silicon (poly-silicon) as the heating resistor is used via the electric insulation film on the semiconductor substrate. However, since the air temperature measuring resistor for detecting the air temperature is not formed, the output corresponding to the flow rate of the air to be measured may contain an error when the air temperature is varied.

On the other hand, the electric insulation film (diaphragm) formed with the heating resistor has to be constructed to achieve thermal insulation with the semiconductor substrate and to be thin in the extent of several microns in total thickness for making a thermal capacity smaller for enhancing response characteristics. Therefore, when the heating resistor repeats heating and cooling or when the air flowrate is increased, excessive stress is loaded on the electric insulation film to possibly cause breakage.

Furthermore, there is a disclosure to use the polycrystalline silicon (poly-silicon) as heating resistor and to perform impurity doping process. However, there is no disclosure for electric resistivity ($\rho$) and temperature coefficient of resistance ($\alpha$) by impurity doping process as important evaluation items as the heating resistor and cannot be said to educe sufficient performance.

On the other hand, in the prior art disclosed in Japanese Patent Application Laid-Open No. Heisei 11-83850 which is commonly owned prior application, for the problem that the output corresponding to the flow rate of the air to be measured may have an error when the air temperature is varied, solution is presented by newly providing the air temperature measuring resistor for detecting the air temperature. Furthermore, the electric insulation film (diaphragm) is constructed to cover the entire surface over a cavity of the semiconductor substrate with the electric insulation film to significantly improve mechanical strength.

However, in the Japanese Patent Application Laid-Open No. Heisei 11-83850 of prior application, study relating to the electric resistivity ($\rho$) and the temperature coefficient of resistance ($\alpha$) by impurity doping process of the polycrystalline silicon (poly-silicon) is not sufficient. Particularly, it lacks study for high concentration impurity doping region resulting in formation of the heating resistor and the temperature measuring resistor with the polycrystalline silicon (poly-silicon) of different impurity concentration to make fabrication process complicate to make the cost high.

Accordingly, an object of the present invention is to provide a low cost thermal type air flow rate sensor and a control system for an internal combustion engine solving the problem in the prior art and fabrication process of which is simplified.

In a thermal type air flow rate sensor formed with at least a heating resistor and a temperature measuring resistor on a semiconductor substrate via an electric insulation film, by forming the heating resistor and the temperature measuring resistor with an impurity doped silicon (Si) semiconductor thin film, and by performing high concentration doping process so that an electric resistivity ($\rho$) of the silicon (Si) semiconductor thin film is less than or equal to $8 \times 10^{-4}$ $\Omega$ cm, sensitivity in measurement can be improved for increasing of a temperature coefficient of resistance ($\alpha$) of the heating resistor and the temperature measuring resistor. Also, since the heating resistor and the temperature measuring resistor can be realized with the same impurity concentration to permit simplification of the fabrication process and lower the cost.

Furthermore, the silicon (Si) semiconductor thin film is processed for high concentration doping of phosphorous (P) as impurity for further increasing the temperature coefficient of resistance ($\alpha$).

On the other hand, the silicon (Si) semiconductor thin film has a polycrystallized structure from an amorphous structure through an impurity thermal diffusion process for further increasing the temperature coefficient of resistance ($\alpha$).

The silicon (Si) semiconductor thin film is enabled high concentration doping through an impurity thermal diffusion process at a temperature higher than or equal to 1050° C. for longer than or equal top 30 minutes.

The semiconductor substrate has a cavity portion, and at least the heating resistor is formed on said cavity portion via an electric insulation film for providing sufficient heat insulation between the heating resistor and the semiconductor substrate to improve sensitivity of the thermal type air flow rate sensor.

By measuring the intake air flow rate of the internal combustion engine using the foregoing thermal type air flow rate sensor, a low cost control system for an internal combustion engine controlling fuel injection amount can be provided.

DETAILED DESCRIPTION OF THE PREFERRED EMBODIMENTS

Embodiments of the present invention will be discussed hereinafter with reference to the drawings.

Figure 1:
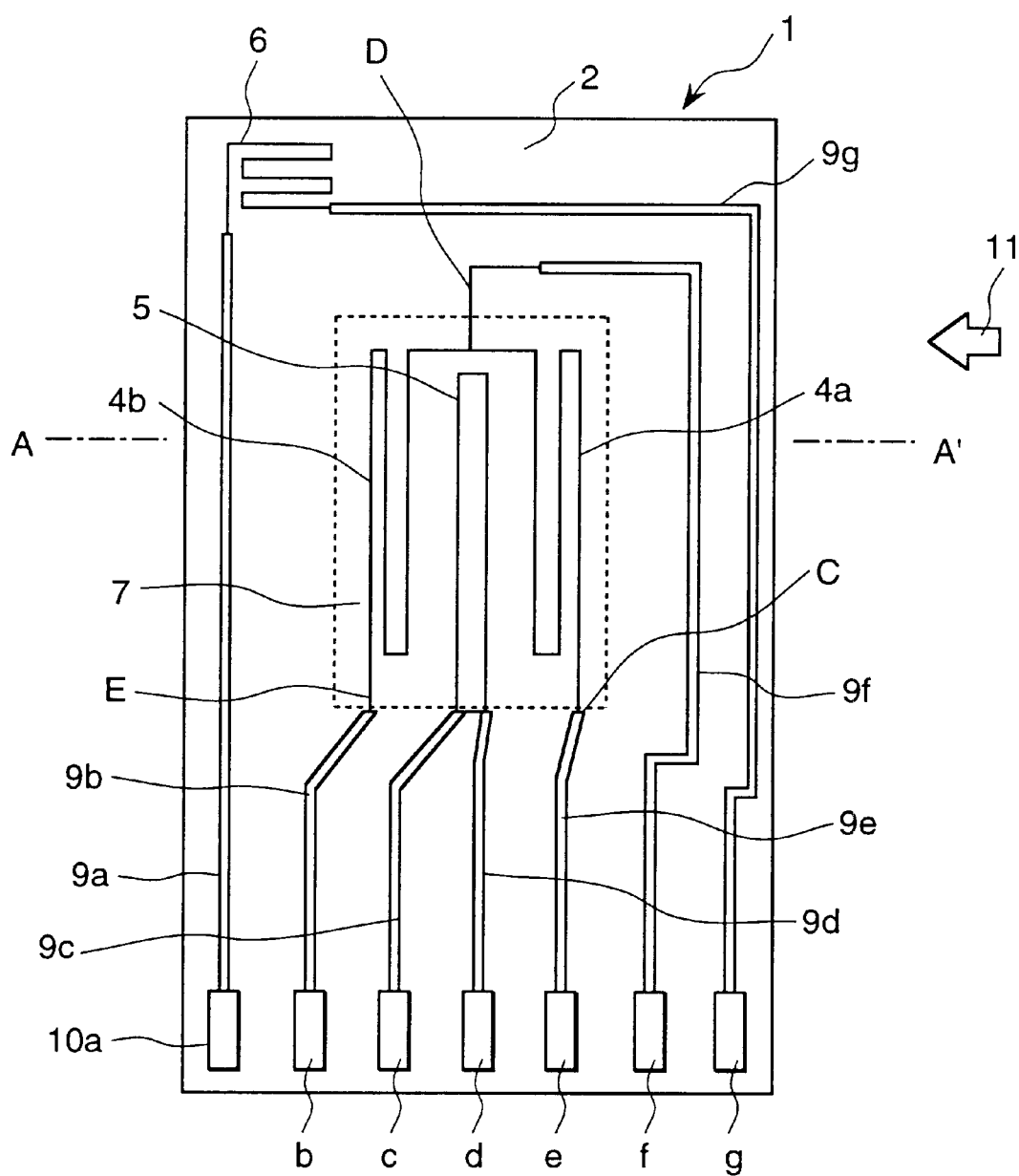
FIG. 1 is an illustration showing a plan view of the first embodiment of the thermal type air flow rate sensor according to the present invention.
Figure 2:
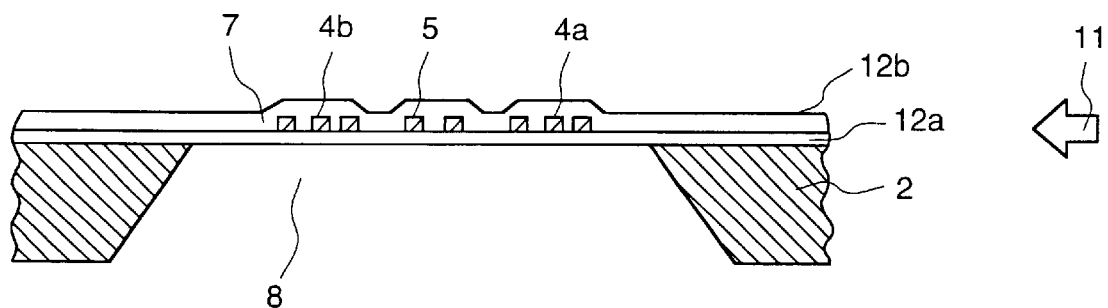
FIG. 2 is an illustration showing an A–A' section of the element of FIG. 1.

FIG. 1 is a plan view showing the first embodiment of a thermal type air flow rate sensor element 1 according to the present invention, and FIG. 2 is a section of the sensor element 1 taken along line A–A' of FIG. 1.

In FIGS. 1 and 2, the element 1 is constituted of a semiconductor substrate 2 of silicon or the like, a diaphragm 7 constructed with electric insulation film 12 (12a, 12b), an upstream side heating resistor 4a and a downstream side resistor 4b formed on the electric insulation film 12a, a temperature measuring resistor 5 detecting a temperature of the heating resistor, an air temperature measuring resistor 6 formed at a tip end portion of the substrate 2 for measuring an air temperature, terminal electrodes 10 (10a, 10b, 10c, 10d, 10e, 10f, 10g) for connecting a signal of the element 1 to external circuits, wiring connecting portion 9 (9a, 9b, 9c, 9d, 9e, 9f, 9g) for connecting respective resistors and terminal electrodes 10, and the electric insulation film 12b for protecting respective resistors. Here, respective resistors 4a, 4b 5, 6 are formed with silicon (Si) semiconductor thin film processed by impurity doping, and is formed by high concentration doping process so that the electric resistivity ($\rho$) of the silicon (Si) semiconductor thin film is less than or equal to $8 \times 10^{-4}$ $\Omega$ cm.

The embodiment of the thermal type air flow rate sensor according to the present invention will perform the following operation.

A pair of the upstream and downstream side heating resistors 4a and 4b are directly connected electrically. A junction (intermediate tap) D is connected to the terminal electrode 10f by a leading electrode 9f. To a pair of heating resistors 4a, 4b formed on the electric insulation film 12a thermally isolated by a cavity 8, a heating (indirect heat) current flows so that a temperature of the temperature measuring resistor 5 detecting temperatures of the heating resistors 4a and 4b can be made higher for a predetermined temperature than a temperature of the air temperature measuring resistor 6 indicative of temperature of an air flow 11.

Direction of the air flow 11 is detected by comparing temperatures (resistance values) of the heating resistors 4a and 4b formed symmetrically with respect to the temperature measuring resistor 5. Namely, the heating resistors 4a and 4b indicate substantially the same temperature as the temperature of the temperature measuring resistor 5 when air flow is zero and no temperature difference is caused. On the other hand, in the direction of air flow 11 of FIG. 11 (forward flow), mainly, the heating resistor 4a arranged on upstream side subjects to greater cooling effect by the air flow 11 than the heating resistor 4b arranged on the downstream side. Also, since the heating resistors 4a, 4b are connected in series and the same heating current is applied to have substantially the same heat generation amount, the temperature of the upstream side heating resistor 4a becomes a lower value than that of the downstream side heating resistor 4b. On the other hand, when the air flow 11 is opposite (reverse flow) of the direction of FIG. 1, then, the temperature of the downstream side heating resistor 4b becomes lower than the temperature of the upstream side heating resistor 4a. Thus, by comparing the temperatures (resistance values) of the heating resistors 4a, 4b, the direction of the air flow 11 can be detected.

On the other hand, since control is performed to make the temperature measuring resistor 5 higher than a given temperature than the air temperature measuring resistor 6, measurement of the air flow rate is performed by a heating (indirect heating) current value to be applied to the heating resistors 4a and 4b. Thus, in the shown embodiment, direction of the air flow and detection of flow rate becomes possible.

Figure 3:
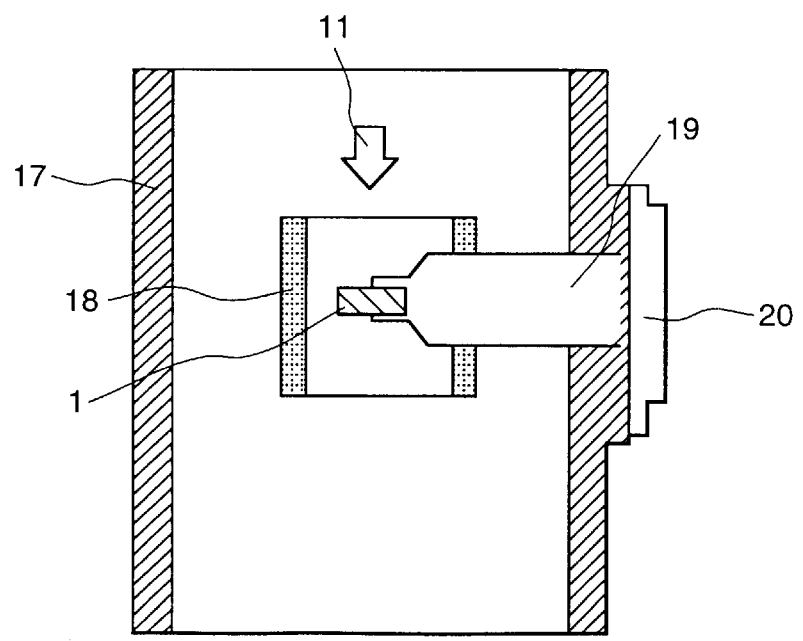
FIG. 3 is an illustration showing a section of the thermal type air flow rate sensor mounting the element of FIG. 1.

FIG. 3 is a section showing the embodiment of the thermal type air flow rate sensor installed the element 1 of FIG. 1. For example, it shows a section showing the embodiment of the thermal type air flow rate sensor installed in an air intake passage of the internal combustion engine of the automotive vehicle or the like. As shown, the thermal type air flow rate sensor is constructed with including the element 1, the supporting body 19 and an external circuit 20. Then, the element 1 is arranged within an auxiliary passage 18 within the air intake passage 17. The external circuit 20 is electrically connected to the terminal electrode 10 of the sensor element 1 via the supporting body 19. Here, normally, the intake air flows in the direction shown by 11, and in certain condition of the internal combustion engine, the intake air flows in the opposite direction (reverse flow).

Figure 4:
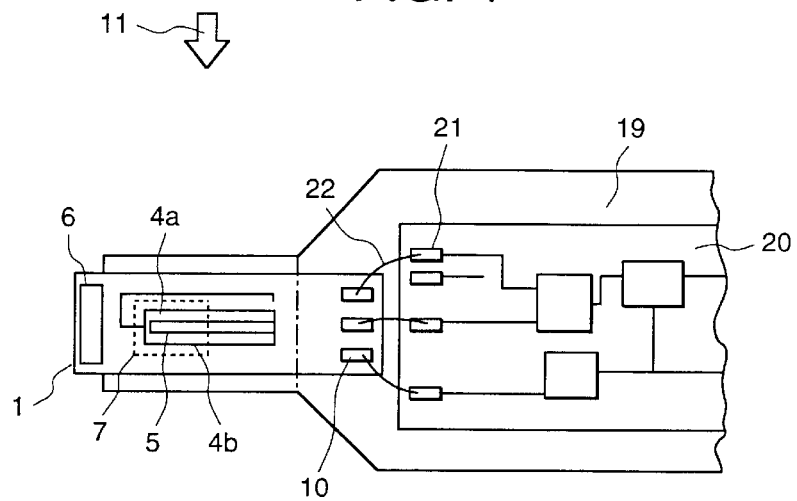
FIG. 4 is an enlarged illustration of a measuring element portion of FIG. 3.

FIG. 4 is an enlarged illustration of the element 1 and the supporting body 18 of FIG. 3. As seen from FIG. 4, the element 1 is fixed on the supporting body 19. Furthermore, on the electric insulation substrate, such as alumina or the like, the terminal electrode 21 and the external circuit 20 formed with a signal processing circuit are fixed on the supporting body 19, in similar manner. The element 1 and the external circuit 20 are electrically connected by wire bonding of gold wire 22 or the like between the terminal electrodes 10 and 21, and thereafter, sealingly protected by the supporting body 19 (not shown) for protecting the gold wire 22, the electrode terminals 10, 21 and the external circuit 20 from upper side.

Figure 5:
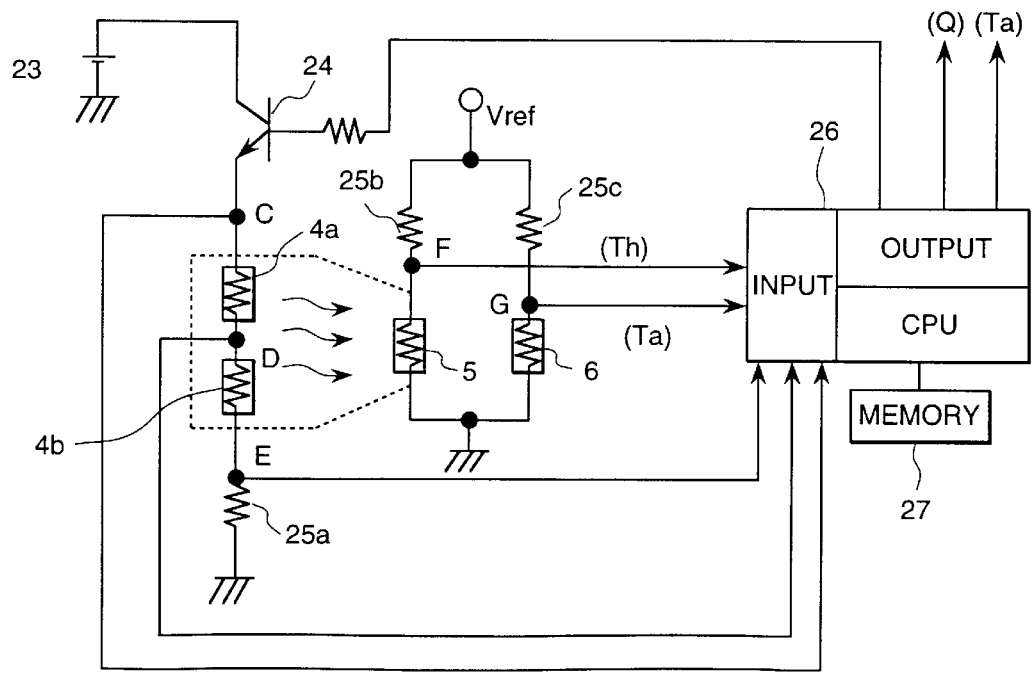
FIG. 5 is an illustration showing an electrical circuit of resistors 4a, 4b, 5 and 6 and an external circuit 20.

Next, circuit operation of the embodiment of the present invention will be discussed with reference to FIG. 5. FIG. 5 shows the resistors 4a, 4b 5, 6 of the element 1 of FIG. 1 and the external circuit 20 for signal processing. In the drawing, 23 denotes a power source, 24 denotes transistor for applying the heating (indirect heating) current for the heating resistors 4a and 4b, 25a, 25b, 25c are resistors, 26 denotes a control circuit comprising an input circuit including an A/D converter or the like, an output circuit including a D/A converter or the like and CPU performing arithmetic process or the like, 27 denotes a memory circuit.

Here, a voltage of terminals F, G of a bridge circuit consisted of the temperature measuring resistor 5, the air temperature measuring resistor 6, the resistors 25b, 25c, is input to the control circuit 26. A temperature (Th) of the temperature measuring resistor 5 indirectly heated by the heating resistors 4a, 4b is controlled by the control circuit 26 set respective resistance value so as to be higher for a given value (e.g. ΔTh=150° C.) than the temperature (Ta) of the air temperature measuring resistor 6. When the temperature of the temperature measuring resistor 5 is lower than a set value, the transistor 24 is turned ON by the output of the control circuit 26 to flow the heating current in the heating resistors 4a, 4b. When the temperature of the temperature measuring resistor 5 is higher than the set temperature, the transistor 24 is controlled to be turned OFF and is controlled to be constant at the set value. At this time, the heating current value (corresponding to the charge E of the resistor 25a) applied to the heating resistors 4a, 4b becomes an air flow rate (Q).

On the other hand, the direction of the air flow is detected by the temperature difference pf the heating resistors 4a, 4b. As set forth above, the temperature measuring resistor 5 is set at a given reference temperature (Th=Ta+ΔTh). Since the heating resistors 4a, 4b are connected in series to be applied the same heating current, when the air flow is forward flow, the upstream side heating resistor 4a is removed head by the air flow in greater amount to make the temperature lower. On the other hand, in case that the air flow is reverse flow, then, the temperature of the heating resistor 4b becomes lower conversely. Namely, by comparing the temperature (resistance value)n of the heating resistors 4a, 4b, the air flow direction can be detected.

In the circuit of FIG. 5, comparison of the temperature (resistance value) of the heating resistors 4a, 4b is performed by potentials at both ends of respective resistors connected in series. A potential difference between the points C and D of FIG. 5 corresponds to the temperature of the upstream side heating resistor 4a and a potential difference between the points D and E corresponds to the temperature of the downstream side heating resistor 4b. Accordingly, by inputting the potentials at the points C, D and E to the control circuit 26, the direction of the air flow is detected from the potential difference corresponding to respective heating resistors.

As set forth above, by constructing by adding the air temperature measuring resistor 6 and the temperature measuring resistor 5, in contrast to the fact that the thermal type air flow rate sensor of the prior art (Japanese Patent No. 2880651) is constructed by only heating resistor, it may not be influenced even if the air temperature is varied, and direction of the air flow is also detected to permit high precision flow rate detection.

Figure 6:
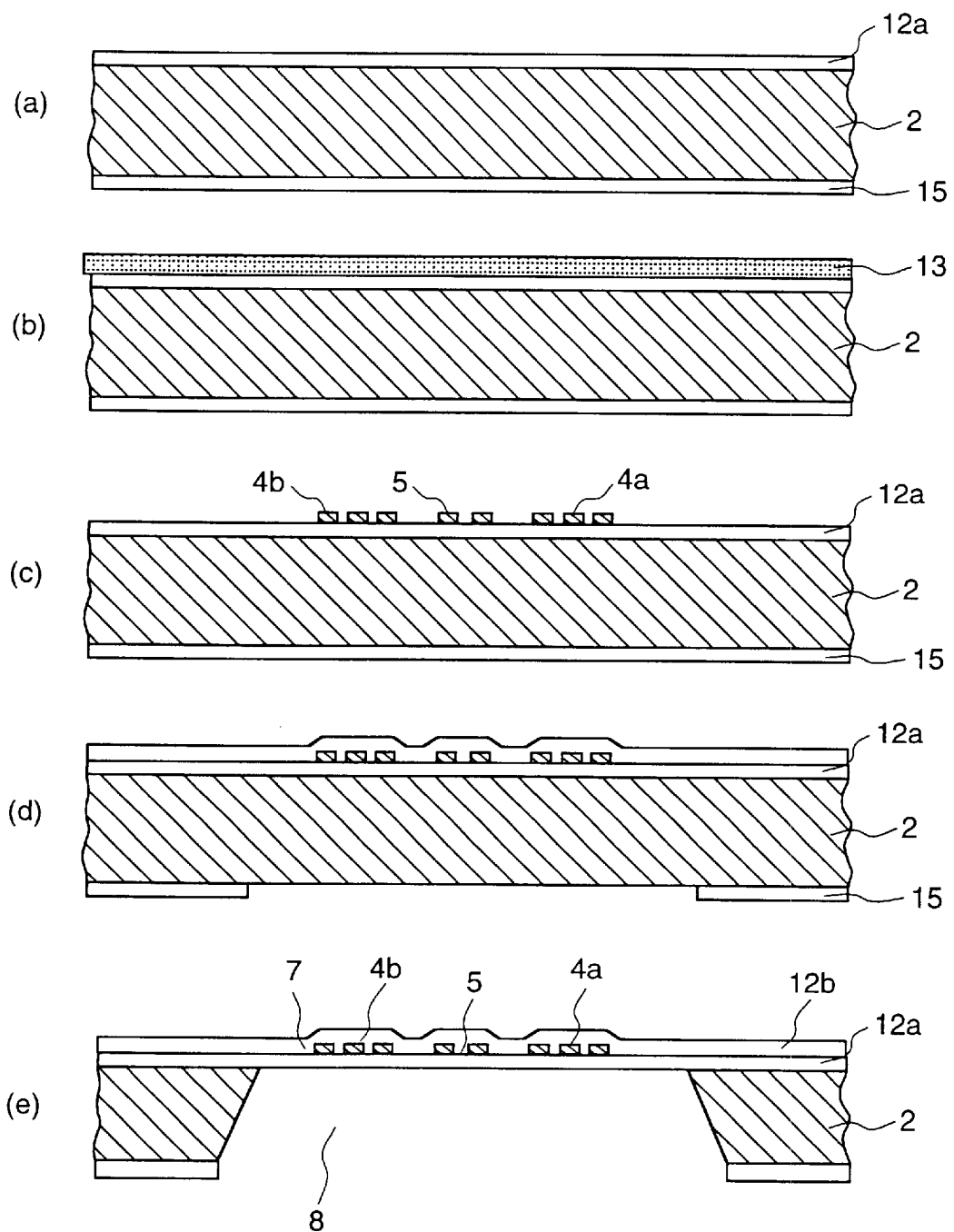
FIG. 6 is an illustration for explaining a fabrication process of the element 1.

Next, particular example of the fabrication process of the shown embodiment of the thermal type air flow rate sensor element will be discussed with reference to FIG. 6.

In FIG. 6(a), on the upper and lower surface of the silicon semiconductor substrate, about 0.5 micron thick of silicon dioxide ($SiO_2$) layers 12a and 15 are formed by thermal oxidation process. Here, as the electric insulation film 12a formed on the upper surface of the silicon semiconductor substrate 2, the material other than silicon dioxide can be used. For example, even when silicon nitride ($Si_3N_4$) having higher mechanical strength, slightly greater residual tensile stress than the silicon semiconductor substrate 2 may be used. In the alternative, by employing a multi-layer structure of a silicon dioxide having thermal expansion coefficient one tenth of the silicon semiconductor substrate 2 and compressive residual stress and a silicon nitride having slightly greater thermal expansion coefficient than the silicon semiconductor substrate 2 for establishing matching of the thermal expansion coefficient and residual stress, deflection due to thermal stress and residual stress between the silicon semiconductor substrate 2 and the electric insulation film 12a can be reduced to improve strength.

On the other hand, by providing similar film structure for the electric insulation film 12b forming the diaphragm, and formed as upper layer of the electric insulation film 12a and taking the film structure symmetric with respect to vertical direction of the silicon (Si) semiconductor thin film 13, deflection due to thermal stress and residual stress can be further reduced to improve strength.

Next, in (b), on the electric insulation film 12a, amorphous silicon (Si) semiconductor thin film as the heating resistors 4a, 4b and the temperature measuring resistors 5 and 6, is formed in a thickness of about 1 micron by a method of CVD or so forth. Here, the amorphous silicon (Si) semiconductor thin film is formed by a method of LPCVD using plasma, ECR-PCVD using electron cyclotron resonance, CVD using the micro wave and so forth. By controlling a forming temperature of the thin film to he lower than or equal to 600° C., amorphous silicon (Si) semiconductor thin film can be obtained.

Next, impurity doping process is performed by thermal diffusion process for the formed amorphous silicon (Si) semiconductor thin film 13. A phosphate glass ($POCl_3$) is formed on the surface of the amorphous silicon (Si) semiconductor thin film 13, and heat treatment is performed at 1050° C. for 30 minutes to form the polycrystalline silicon (Si) semiconductor thin film 13, for which high concentration phosphorous (P) doping process is performed so that the electric resistivity is less than or equal to $8 \times 10^{-4}$ Ω cm, is formed.

Here, after formation of the amorphous film as the silicon (Si) semiconductor thin film 13, it is formed into polycrtal through thermal diffusion process. This process permits higher concentration phosphorous (P) doping process becomes possible in comparison with the case where the polycrystal is formed in advance and thermal diffusion is performed subsequently, for lowering electric resistivity (ρ), and in conjunction therewith, temperature coefficient of resistance (α) becomes large to have an appropriate material characteristics as resistor body.

Next, in (c), after formation into a predetermined shape of the resist by a known photolithographic technology, the semiconductor thin film 13 is patterned by a method, such as reactive ion etching or the like to form the heating resistors 4a, 4b, the temperature measuring resistor 5 and the air temperature measuring resistor 6 (not shown). Subsequently, while not illustrated connecting terminal electrodes 10 (10a, 10b, 10c, 10d, 10e, 10f, 10g) and wiring connecting portions 9 (9a, 9b, 9c, 9d, 9f, 9g) for connecting each resistor and the terminal electrodes 10 are formed by aluminum, gold or the like.

In (d), in order to protect portions other than the terminal electrodes 10, the electric insulation film 12b is formed in a thickness of about 0.5 microns in similar manner as the former electric insulation film 12a. Next, in order to form a cavity 8 in the silicon semiconductor substrate 2, a masking material 15 for etching is patterned into a predetermined shape to expose only etching portion of the semiconductor substrate 2. As the masking material 15, silicon dioxide or silicon nitride having higher etching selection ratio may be used.

In (e), finally, with taking the silicon dioxide or silicon nitride as the masking material, antistrophic etching is performed from the back surface of the silicon semiconductor substrate 2 using an etchant, such as potassium hydroxide (KOH) or the like for forming the cavity 8.

As the impurity in the foregoing embodiment, P (phosphorous) is used. However, as the same n type impurity, N (nitrogen), Sb (antimony), As (arsenic) or as p-type impurity, Al (aluminum), B (Boron) and so forth may be used. However, for doping impurity at high concentration, P (phosphorous) having high solid solubility at high temperature is optimal.

On the other hand, in the foregoing embodiment, which an example where the amorphous film is polycrystallized by thermal diffusion process as the silicon (Si) semiconductor thin film 13. However, similar effect can be obtained by applying monocrystal using SOI (silicon-on-Insulator).

With the construction as set forth above, since the diaphragm 7 on the cavity 8 where the heating resistors 4a, 4b and the temperature measuring resistor 5 are formed, has a construction to cover the entire surface over the cavity 8, in comparison with the prior art (Japanese Patent No. 2880651), sufficient mechanical strength can be maintained even when the heating resistor repeats heating and cooling, when air flow is increased, and when large stress is loaded.

On the other hand, by forming the heating resistors 4a, 4b and the temperature measuring resistors 5, 6 with the doping-processed silicon (Si) semiconductor thin film, and by high concentration doping of phosphorous (P) so that the electric resistivity is less than or equal to $8 \times 10^{-4}$ Ω cm, the temperature coefficient of resistance (α) of the temperature measuring resistors 5, 6 can be maintained to be relatively large to improve temperature measuring sensitivity. Furthermore, by forming the heating resistors 4a, 4b and the temperature measuring resistors 5, 6 with the silicon (Si) semiconductor thin film of the same impurity concentration, the silicon (Si) semiconductor thin films are formed simultaneously in a lump. Therefore, in comparison with Japanese Patent Application Laid-Open No. Heisei 11-83580, it becomes possible to provide the thermal type air flow rate sensor which is simplified the fabrication process and low cost.

Figure 7:
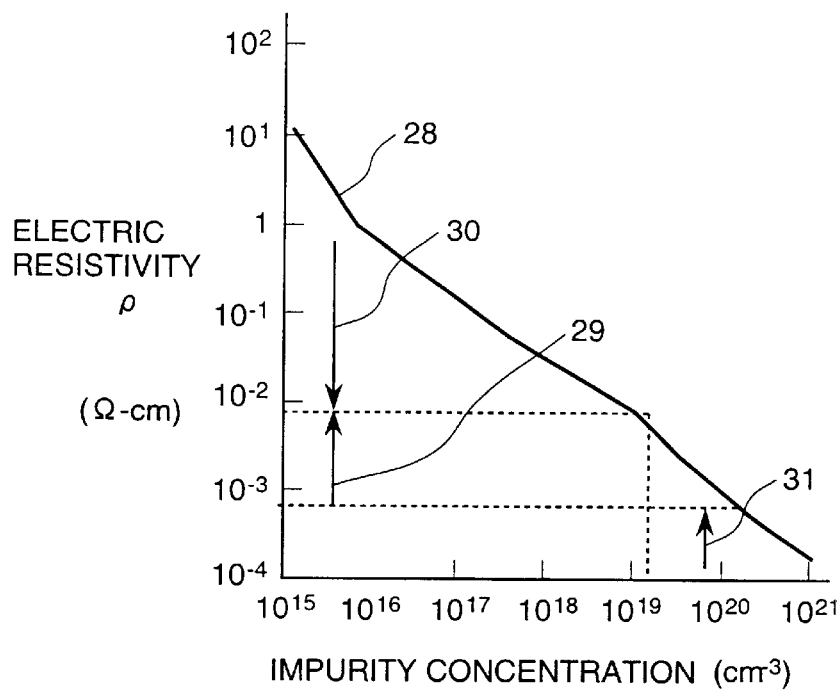
FIG. 7 is an illustration showing a relationship between an electrical resistivity ($\rho$) and an impurity concentration of a silicon semiconductor thin film.
Figure 8:
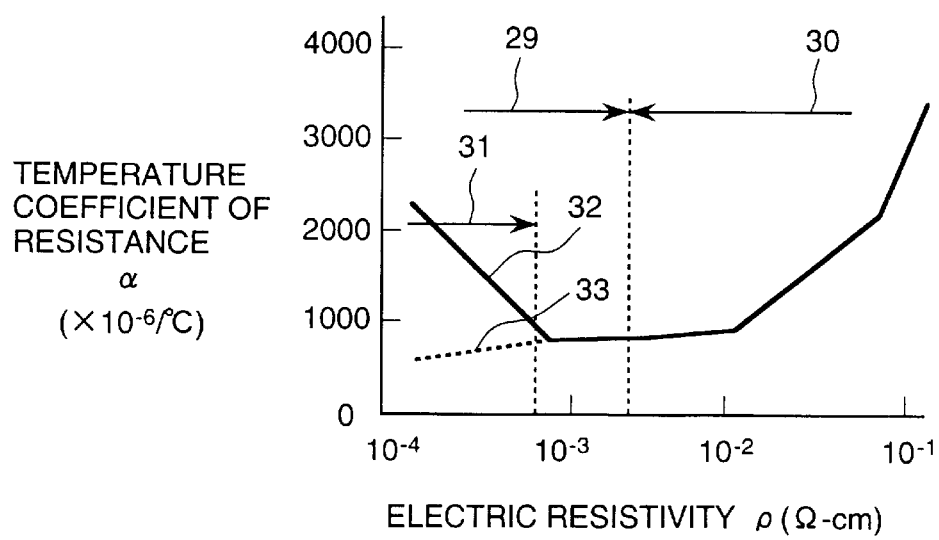
FIG. 8 is an illustration showing a relation ship between a temperature coefficient of resistance ($\alpha$) and the electric resistivity ($\rho$) of the silicon (Si) semiconductor thin film.
Figure 9:
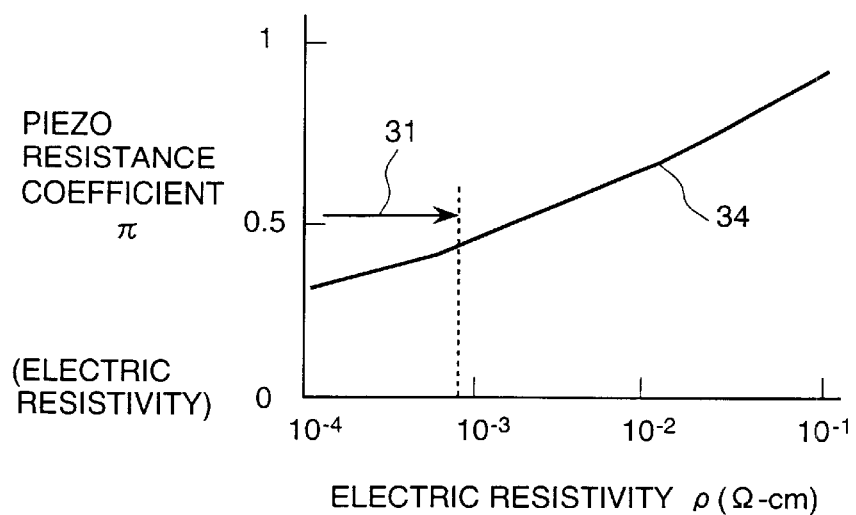
FIG. 9 is an illustration showing a relationship between a piezo resistance coefficient ($\pi$) and the electric resistivity ($\rho$) of the silicon (Si) semiconductor thin film.

FIG. 7 shows a relationship between the electric resistivity (ρ) of the silicon (Si) semiconductor thin film and the impurity concentration, FIG. 8 shows a relationship between temperature coefficient of resistance (α) and electric resistivity (ρ), and FIG. 9 shows a relationship between a piezo resistance coefficient (π) and the electric resistivity (ρ).

In Japanese Patent Application Laid-Open No. Heisei 11-83580 of the prior application, a region 29 where the impurity concentration shown in FIGS. 7 and 8 is less than or equal to $3 \times 10^{19}$ (cm$^{-3}$) is applied to the heating resistors 4a, 4b, and a region 30 where the impurity concentration is greater than or equal to $3 \times 10^{19}$ (cm$^{-3}$) is applied to the temperature measuring resistor 5. The reason is that a relationship between the temperature coefficient of resistance (α) and the electric resistivity (ρ) of the silicon (Si) semiconductor thin film shown in FIG. 8 is the relationship as shown by broken line 33 in the region doped at high concentration.

Assuming that the relationship of the broken line 33 shown in FIG. 8 is established, the following result of Japanese Patent Application Laid-open No. Heisei 11-83580 as prior application is caused.

In general, the silicon (Si) semiconductor film shows a thermistor like resistance-temperature characteristics. When the temperature range is relatively narrow and impurity is doped, metallic resistance-temperature characteristics is expressed by the expression (1).

$$R = R0(1 + \alpha(T - T0)) \tag{1}$$

wherein R is a resistance value of the semiconductor film at temperature (T), R0 is a resistance value of the semiconductor film at temperature (T0), and a is a temperature coefficient of resistance.

Particularly, as the temperature measuring resistors 5, 6, it is desired for large variation of the resistance value with respect to the temperature for large temperature coefficient of resistance (α) to improve detection sensitivity. Accordingly, assuming the broken line 33 of FIG. 8, the relationship between the electric resistivity (ρ) and the temperature coefficient of resistance (α) becomes monotone increasing. As the temperature measuring resistors 5, 6, the region 30 where temperature coefficient of resistance (α) is greater than or equal to 1000 ($\times 10^{-6}$/° C.) (electric resistivity (ρ) is greater than or equal to $30 \times 10^{-4}$ Ω cm, and impurity concentration is less than or equal to $3 \times 10^{19}$ (cm$^{-3}$) is selected.

On the other hand, as the heating resistors 4a, 4b, the same impurity concentration region 30 as the temperature measuring resistors 5, 6 may have too large electric resistivity (ρ). When the heating resistors 4a, 4b are to be heated to the predetermined temperature (e.g. 200° C.), the resistance value of the heating resistors 4a, 4b become large to require high driving voltage to cause difficult for sufficiently heat. Accordingly, as the heating resistors 4a, 4b, a region where the impurity concentration shown by the region 29 of FIG. 8 is greater than or equal to $3 \times 10^{19}$ (cm$^{-3}$) and the electric resistivity (ρ) is less than or equal to $30 \times 10^{04}$ Ω cm, is selected.

As set forth, in Japanese Patent Application Laid-open No. Heisei 11-83580 of the prior application, the temperature measuring resistors 5, 6 and the heating resistors 4a, 4b are selected to have different impurity concentrations to make fabrication process complicate and make the cost high.

Subsequently, in the relationship of the temperature coefficient of resistance (α) and the electric resistivity (ρ) shown in FIG. 8, as a result of detailed study concerning a region having high concentration impurity concentration, namely low electric resistivity (ρ), actually as shown by solid line 32, it has been newly found that, in the region where the electric resistivity (ρ) is less than or equal to $8 \times 10^{-4}$ Ω cm, the temperature coefficient of resistance (α) is increased.

Accordingly, in the region 31 where the electric resistivity (ρ) is less than or equal to $8 \times 10^{-4}$ Ω cm shown in FIG. 8, large temperature coefficient of resistance (α) (greater than or equal to 1000 ($\times 10^{-6}$/° C.)) can be realized by low electric resistivity (ρ). As a result, for both of the temperature measuring resistors 5, 6 and the heating resistors 4a, 4b, a region 31 where the electric resistivity (ρ) is less than or equal to $8 \times 10^{-4}$ Ω cm can be applied. Thus, since the silicon (Si) semiconductor thin film having the same impurity concentration can be formed simultaneously in a lump, in comparison with the fabrication process in Japanese Patent Application Laid-Open No. Heisei 11-83580 of prior application, the thermal type air flow rate sensor with simplified fabrication process and low cost can be provided.

Furthermore, as shown by a relationship between piezo resistance coefficient (π) and the electric resistivity (ρ) shown in FIG. 9, according to increasing of impurity concentration (electric resistivity (ρ) becomes smaller), the piezo resistance coefficient (π) becomes smaller.

The relationship between the piezo resistance coefficient (π) and resistance variation (ΔR/R) is expressed as the following expression (2).

$$(\Delta R/R) = (\pi) \times \Delta\sigma \quad (2)$$

wherein $\Delta\sigma$ is stress variation applied to resistor (R).

As thermal type air flow rate sensor, it is desired that the resistance variation ($\Delta R/R$) of the resistor is variable depending only on the temperature as shown in the expression (1) and the piezo resistance coefficient ($\pi$) as resistance variation factor other than the temperature is small. When the piezo resistance coefficient ($\pi$) is large, stress in fabrication process in resistor and electric insulation film formation, etching and so forth causes aging to also vary resistance value (R) to make it impossible to accurately measure the air flow rate.

In the present invention, for both of the temperature measuring resistors 5, 6 and the heating resistors 4a, 4b, a region 31 where the electric resistivity ($\rho$) is less than or equal to $8 \times 10^{-4}$ Ω cm can be applied, the piezo resistance coefficient ($\pi$) can be made small. Therefore, in comparison with the fabrication process in Japanese Patent Application Laid-Open No. Heisei 11-83580 of prior application, stable air flow rate measurement becomes possible.

Figure 10:
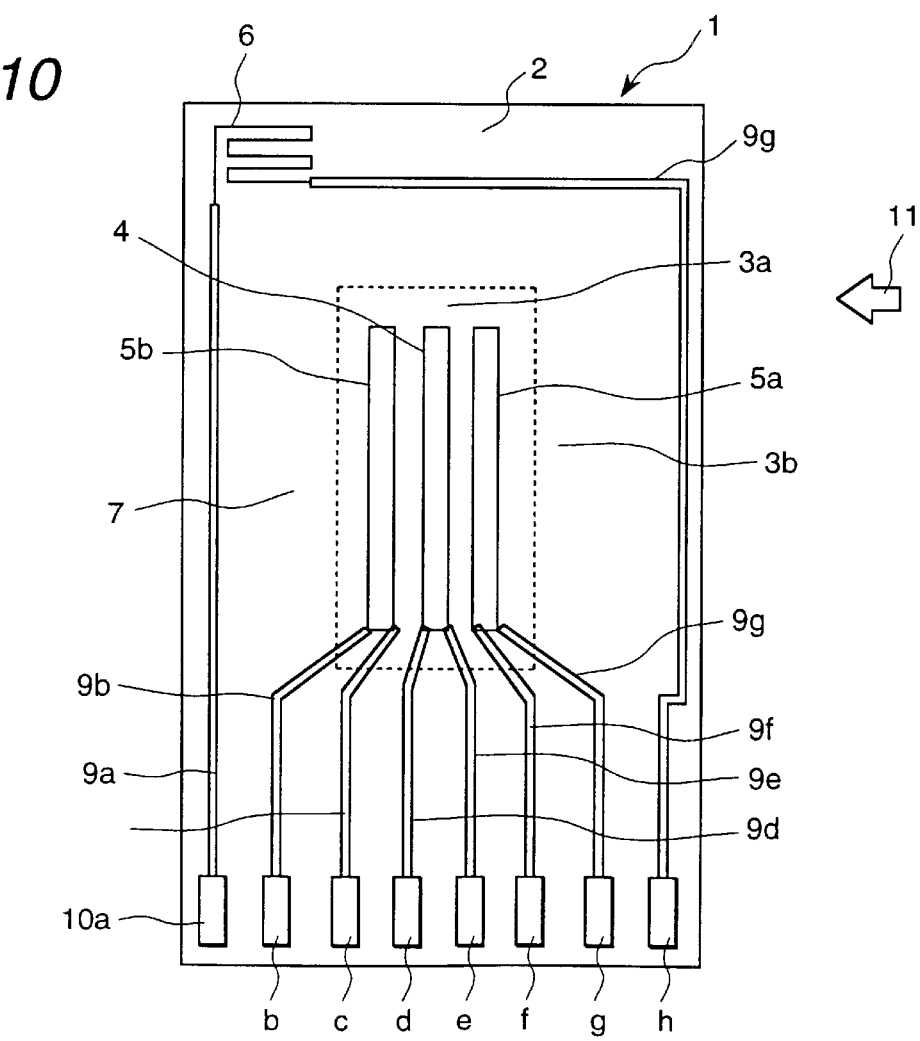
FIG. 10 is an illustration showing a plan view of the second embodiment of the thermal type air flow rate sensor element 1 according to the present invention.

Next, discussion will be given for the second embodiment of the present invention. FIG. 10 is a plan view of the second embodiment of the thermal type air flow rate sensor element 1 according to the present invention. What is different from the first embodiment of FIG. 1, the temperature measuring resistors 5a, 5b are formed upstream and downstream of the heating resistor 4.

As set forth above, in case of the temperature difference detection system where the temperature measuring resistors 5a, 5b are arranged upstream and downstream of the heating resistor 4 and the air flow rate is measured from the temperature difference of the up- and downstream temperature measuring resistors 5a, 5b, for both of the temperature measuring resistors 5, 6 and the heating resistors 4a, 4b, a region 31 where the electric resistivity ($\rho$) is less than or equal to $8 \times 10^{-4}$ Ω cm can be applied. Thus, since the silicon (Si) semiconductor thin film having the same impurity concentration can be formed simultaneously in a lump, the thermal type air flow rate sensor with simplified fabrication process and low cost can be provided.

Even for any other system, it is obvious to apply the present invention set forth above for the thermal type air flow rate sensor constructed with the heating resistor and the temperature measuring resistor on the semiconductor substrate 2.

With the shown embodiments, in the thermal type air flow rate sensor measuring the air flow rate by forming at least the heating resistor and temperature measuring resistor on the semiconductor substrate via the electric insulation layer, the heating resistor and the temperature measuring resistor are formed with doped silicon (Si) semiconductor thin film, the high concentration doped region 31 of the electric resistivity ($\rho$) is less than or equal to $8 \times 10^{-4}$ Ω cm. Thus, since the silicon (Si) semiconductor thin film having the same impurity concentration can be formed simultaneously in a lump, the thermal type air flow rate sensor with simplified fabrication process and low cost can be provided.

What is claimed is:

1. A thermal type air flow rate sensor formed with at least a heating resistor and a temperature measuring resistor on a semiconductor substrate via an electric insulation film, wherein said heating resistor and the temperature measuring resistor are formed with an impurity-doped silicon semiconductor thin film having an electric resistivity ($\rho$) of the silicon semiconductor thin film less than or equal to $8 \times 10^{-4}$ Ω cm imparted via high concentration doping.

2. The thermal type air flow rate sensor as set forth in claim 1, wherein said silicon (Si) semiconductor thin film is processed for high concentration doping of phosphorus (P) as impurity.

3. The thermal type air flow rate sensor as set forth in claim 1, wherein said silicon (Si) semiconductor thin film is a monocrystal.

4. The thermal type air flow rate sensor as set forth in claim 1, wherein said silicon (Si) semiconductor thin film has a polycrystallized structure from an amorphous structure through an impurity thermal diffusion process.

5. The thermal type air flow rate sensor as set forth in claim 4, wherein said silicon (Si) semiconductor thin film is processed by high concentration doping through an impurity thermal diffusion process at a temperature higher than or equal to 1050° C. for longer than or equal to 30 minutes.

6. The thermal type air flow rate sensor as set forth in claim 1, wherein said semiconductor substrate has a cavity portion, and said heating resistor is formed on said cavity portion via an electric insulation film.

7. A control system for an internal combustion engine measuring an intake air flow rate using a thermal type air flow rate sensor as set forth in claim 1, and controlling a fuel injection amount.

8. A thermal type air flow rate sensor including resistor film comprised of an impurity-doped silicon semiconductor thin film provided on a semiconductor substrate via an insulation film and generating a heat by power supply, and a control circuit controlling heat generation of said resistor film, wherein a temperature coefficient of said resistor film is greater than or equal to $1000 \times 10^{-6}/°$ C. and an electric resistivity is less than or equal to $8 \times 10^{-4}$ Ω cm.

9. The thermal type air flow rate sensor as set forth in claim 8, wherein said semiconductor substrate is provided with a cavity portion.

10. The thermal type air flow rate sensor as set forth in claim 9, wherein said insulation film covers at least a part of said cavity portion.

11. A detection element for a thermal type air flow rate sensor comprising:

a semiconductor substrate; and a resistor film comprised of an impurity-doped silicon semiconductor thin film provided on said semiconductor substrate via an insulation film and a temperature coefficient of resistance greater than or equal to $1000 \times 10^{-6}/°$ C. and an electric resistivity less than or equal to $8 \times 10^{-4}$ Ω cm.

12. A detection element for a thermal type air flow rate sensor as set forth in claim 11, wherein said semiconductor substrate is formed with a cavity portion.

13. A detection element for a thermal type air flow rate sensor as set forth in claim 12, wherein said insulation film covers at least a part of said cavity portion.

* * * * *